US010252488B2

(12) United States Patent
Tam et al.

(10) Patent No.: US 10,252,488 B2
(45) Date of Patent: Apr. 9, 2019

(54) STAB AND BALLISTIC RESISTANT ARTICLES AND THE PROCESS OF MAKING

(71) Applicant: HONEYWELL INTERNATIONAL INC., Morris Plains, NJ (US)

(72) Inventors: Thomas Tam, Chesterfield, VA (US); Mark Benjamin Boone, Mechanicsville, VA (US); Ashok Bhatnagar, Richmond, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 404 days.

(21) Appl. No.: 14/996,343

(22) Filed: Jan. 15, 2016

(65) Prior Publication Data

US 2016/0129669 A1    May 12, 2016

Related U.S. Application Data

(62) Division of application No. 13/835,008, filed on Mar. 15, 2013, now Pat. No. 9,243,354.

(51) Int. Cl.
| | |
|---|---|
| *F41H 1/02* | (2006.01) |
| *B32B 5/26* | (2006.01) |
| *D03D 1/00* | (2006.01) |
| *B32B 5/02* | (2006.01) |
| *D06C 7/00* | (2006.01) |
| *D03D 13/00* | (2006.01) |
| *D03D 15/00* | (2006.01) |
| *B32B 27/12* | (2006.01) |
| *B32B 27/32* | (2006.01) |
| *B32B 37/16* | (2006.01) |
| *F41H 5/04* | (2006.01) |
| *B32B 7/00* | (2019.01) |
| *B32B 5/12* | (2006.01) |

(52) U.S. Cl.
CPC ............... *B32B 5/26* (2013.01); *B32B 5/024* (2013.01); *B32B 7/005* (2013.01); *B32B 27/12* (2013.01); *B32B 27/32* (2013.01); *B32B 37/16* (2013.01); *D03D 1/0041* (2013.01); *D03D 1/0052* (2013.01); *D03D 13/008* (2013.01); *D03D 15/00* (2013.01); *D03D 15/0094* (2013.01); *D06C 7/00* (2013.01); *F41H 1/02* (2013.01); *F41H 5/0485* (2013.01); *B32B 5/12* (2013.01); *B32B 2262/0215* (2013.01); *B32B 2262/0253* (2013.01); *B32B 2305/188* (2013.01); *B32B 2307/54* (2013.01); *B32B 2307/558* (2013.01); *B32B 2307/56* (2013.01); *B32B 2307/734* (2013.01); *B32B 2571/00* (2013.01); *B32B 2571/02* (2013.01); *D10B 2401/041* (2013.01); *D10B 2401/063* (2013.01); *Y10T 442/30* (2015.04); *Y10T 442/3065* (2015.04); *Y10T 442/3472* (2015.04)

(58) Field of Classification Search
CPC .... B32B 2262/0215; B32B 2262/0253; B32B 2305/188; B32B 2307/54; B32B 2307/558; B32B 2307/56; B32B 2307/734; B32B 2571/00; B32B 2571/02; B32B 27/12; B32B 27/32; B32B 37/16; B32B 5/024; B32B 5/12; B32B 5/26; B32B 7/005; Y10T 442/30; Y10T 442/3065; Y10T 442/3472; F41H 1/02; F41H 5/0485; D10B 2401/041; D10B 2401/063; D06C 7/00; D03D 13/008; D03D 15/00; D03D 15/0094; D03D 1/0041; D03D 1/0052
USPC ....... 2/2.5; 428/98, 101, 105, 112, 113, 114, 428/189, 190, 221, 911, 920; 442/134, 442/135, 181, 183, 184, 185, 186, 189, 442/203, 286
See application file for complete search history.

(56) References Cited

U.S. PATENT DOCUMENTS

| | | |
|---|---|---|
| 4,457,985 A | 7/1984 | Harpell et al. |
| 4,680,213 A | 7/1987 | Fourezon |
| 4,748,064 A | 5/1988 | Harpell et al. |
| 5,102,725 A | 4/1992 | Knox et al. |
| 5,724,670 A | 3/1998 | Price |
| 5,804,015 A | 9/1998 | McCarter et al. |
| 6,280,546 B1 | 8/2001 | Holland et al. |
| 6,281,149 B1 * | 8/2001 | Hussein .................... B32B 5/24 139/383 R |
| 6,610,618 B1 | 8/2003 | Bottger et al. |
| 7,514,378 B2 | 4/2009 | Howland |
| 7,642,206 B1 | 1/2010 | Bhatnagar et al. |
| 7,910,503 B2 | 3/2011 | Krueger et al. |
| 7,964,261 B2 | 6/2011 | Backer et al. |
| 7,964,266 B2 | 6/2011 | Harding et al. |

(Continued)

FOREIGN PATENT DOCUMENTS

| | | |
|---|---|---|
| EP | 0747518 | 12/1996 |
| JP | 2007063710 | 3/2007 |

(Continued)

OTHER PUBLICATIONS

Supplemental European Search Report for EP14807543.
Moss et al. "Effects of weave type on the ballistic performance of fabrics." AIAA Journal, v 50, n 11, p. 2558-2565, Nov. 2012; ISSN: 00011452; DOI: 10.2514/1.J051708; American Institute of Aeronautics and Astronautics Inc.

(Continued)

*Primary Examiner* — Arti Singh-Pandey
(74) *Attorney, Agent, or Firm* — Roberts & Roberts, LLP; Richard S. Roberts, Jr.

(57) ABSTRACT

Dimensionally stable open woven fabrics formed from a plurality of high tenacity warp elongate bodies interwoven and bonded with a plurality of transversely disposed, high tenacity weft elongate bodies, composite articles formed therefrom, and to a continuous process for forming the composite articles.

10 Claims, 4 Drawing Sheets

(56) References Cited

U.S. PATENT DOCUMENTS

| | | |
|---|---|---|
| 7,964,518 B1 | 6/2011 | Bhatnagar et al. |
| 7,993,715 B2 | 8/2011 | Geva et al. |
| 8,168,022 B2 | 5/2012 | Backer et al. |
| 8,349,112 B2 | 1/2013 | Backer et al. |
| 2002/0034624 A1 | 3/2002 | Harpell et al. |
| 2002/0164912 A1 | 11/2002 | Fawcett et al. |
| 2003/0008583 A1 | 1/2003 | Chiou |
| 2006/0035078 A1 | 2/2006 | Tam et al. |
| 2006/0252325 A1 | 11/2006 | Matsumura et al. |
| 2009/0311930 A1 | 12/2009 | Wang et al. |
| 2010/0124862 A1 | 5/2010 | Smith |
| 2010/0275764 A1 | 11/2010 | Egres |
| 2010/0316838 A1 | 12/2010 | Krummel |
| 2010/0317248 A1 | 12/2010 | Chang |
| 2011/0041677 A1 | 2/2011 | De Weijer |
| 2011/0097021 A1 | 4/2011 | Curran et al. |
| 2011/0174147 A1 | 7/2011 | Steeman et al. |
| 2011/0256341 A1 | 10/2011 | Geva et al. |
| 2011/0269359 A1 | 11/2011 | Tam et al. |
| 2012/0085224 A1 | 4/2012 | Jongedijk et al. |
| 2012/0128947 A1 | 5/2012 | Bohringer |
| 2012/0189805 A1 | 7/2012 | Backer et al. |
| 2012/0258301 A1 | 10/2012 | Tam et al. |
| 2014/0272271 A1 | 9/2014 | Tam et al. |
| 2017/0080678 A1* | 3/2017 | Bhatnagar ............... B32B 5/022 |

FOREIGN PATENT DOCUMENTS

| | | |
|---|---|---|
| JP | 2007298220 | 11/2007 |
| JP | 2008001995 | 1/2008 |
| WO | 2006045256 | 5/2006 |
| WO | 2009141276 | 11/2009 |

OTHER PUBLICATIONS

Phoenix et al. "New Interference Approach for Ballistic Impact into Stacked Flexible Composite Body Armor." AIAA Journal, v 48, n 2, p. 490-501, Feb. 2010; ISSN: 00011452; DOI: 10.2514/1.45362; American Institute of Aeronautics and Astronautics Inc.

Lee et al. "Failure of Spectraqq* polyethylene fiber-reinforced composites under ballistic impact loading." Journal of Composite Materials, v 28, n 13, p. 1202-1226, 1994; ISSN: 00219983; Technomic Publ Co Inc.

International Search Report and Written Opinion of the International Searching Authority for Corresponding Application PCT/US2014/023864.

Chen et al., "Ballistic Resistance Analysis of High Strength Fibers With Different Combination," Chung Cheng Institute of Technology; vol. 37, No. 2, p. 33-42 (English translation pp. 1-18); May 2009; Taiwan.

* cited by examiner

(PRIOR ART)

STAB AND BALLISTIC RESISTANT ARTICLES AND THE PROCESS OF MAKING

CROSS-REFERENCE TO RELATED APPLICATION

This application is a Division of co-pending application Ser. No. 13/835,008, filed Mar. 15, 2013, now U.S. Pat. No. 9,243,354, the entire disclosure of which is incorporated by reference herein.

BACKGROUND

Technical Field

This technology relates to stab resistant, closed woven composite articles formed by thermally fusing an open woven fabric formed from high tenacity, thermoplastic elongate bodies, and to a continuous process for forming the composite articles.

Description of the Related Art

High tenacity fibers, such as SPECTRA® polyethylene fibers or aramid fibers such as KEVLAR® and TWARON® fibers, are known to be useful for the formation of articles having excellent ballistic resistance. Ballistic resistant articles formed from high tenacity tapes are also known. Articles such as bullet resistant vests, helmets, vehicle panels and structural members of military equipment are typically made from fabrics comprising high tenacity fibers or tapes because of their very high strength to weight performance. For many applications, the fibers or tapes may be formed into woven or knitted fabrics. For other applications, the fibers or tapes may be encapsulated or embedded in a polymeric matrix material and formed into non-woven fabrics. In one common non-woven fabric structure, a plurality of unidirectionally oriented fibers are arranged in a generally coplanar, coextensive relationship and coated with a binding matrix resin to bind the fibers together. Typically, multiple plies of such unidirectionally oriented fibers are merged into a multi-ply composite. See, for example, U.S. Pat. Nos. 4,403,012; 4,457,985; 4,613,535; 4,623,574; 4,650,710; 4,737,402; 4,748,064; 5,552,208; 5,587,230; 6,642,159; 6,841,492; and 6,846,758, all of which are incorporated herein by reference to the extent consistent herewith.

Composites fabricated from non-woven fabrics are known to stop projectiles better than woven fabric composites because the component fibers in non-woven fabrics are not crimped like the fibers in woven materials. Fiber crimping reduces the ability of the fibers to stay in tension and immediately absorb the energy of a projectile, compromising their effectiveness. In addition, projectile damage to non-woven fabrics is more localized compared to woven fabrics, allowing for enhanced multi-hit performance. However, woven composites are more stab resistant than traditional non-woven fabrics formed from parallel fiber arrays, because the mechanically interlocking woven fabric structure creates superior friction than that is better at preventing blades from piercing through the fabric.

Nevertheless, stab resistant woven fabric articles of the related art remain imperfect. Such woven fabrics require a very tight weave (i.e. a pick count of greater than 56×56 per inch) so that the fabric or fabric layers will not shift on blade impact and to create sufficient friction to prevent the blade from piercing the fabric. Creating woven fabrics of such high density requires the use of very fine, high quality yarns that are expensive to manufacture. Also, the use of such fine yarns requires that they be highly twisted and/or highly commingled, but the fine yarns are delicate and often break during twisting or commingling, keeping productivity low. Finally, composites formed from twisted fibers are less effective at stopping bullets or other projectiles than composites formed from untwisted fibers. Accordingly, there is an ongoing need in the art for improved woven ballistic resistant composites having both superior stab resistance and superior ballistic resistance. The present invention provides a solution to this need.

SUMMARY

The invention provides a woven fabric comprising a plurality of warp elongate bodies interwoven and bonded with a plurality of transversely disposed weft elongate bodies, said warp elongate bodies and weft elongate bodies each comprising thermoplastic high tenacity elongate bodies having a tenacity of at least about 14 g/denier and a tensile modulus of at least about 300 g/denier, wherein immediately adjacent warp elongate bodies are spaced apart from each other by a distance equivalent to at least about 10% of the width of the warp elongate bodies and immediately adjacent weft elongate bodies are spaced apart from each other by a distance equivalent to at least about 10% of the width of the weft elongate bodies.

The invention also provides closed, fused sheets formed from a woven fabric, and multilayer articles formed from said closed, fused sheets.

The invention further provides a process for forming a dimensionally stable open fabric, the process comprising:
a) providing a woven fabric comprising a plurality of warp elongate bodies interwoven and bonded with a plurality of transversely disposed weft elongate bodies, said warp elongate bodies and weft elongate bodies each comprising thermoplastic high tenacity elongate bodies having a tenacity of at least about 14 g/denier and a tensile modulus of at least about 300 g/denier, wherein immediately adjacent warp elongate bodies are spaced apart from each other by a distance equivalent to at least about 10% of the width of the warp elongate bodies and immediately adjacent weft elongate bodies are spaced apart from each other by a distance equivalent to at least about 10% of the width of the weft elongate bodies;
b) at least partially melting the thermoplastic polymer of the high tenacity warp elongate bodies and/or the high tenacity weft elongate bodies; and
c) allowing the melted thermoplastic polymer of the high tenacity warp elongate bodies and/or the high tenacity weft elongate bodies to solidify, whereby the high tenacity warp elongate bodies and the high tenacity weft elongate bodies are bonded to each other, thereby forming a dimensionally stable open fabric.

The invention still further provides a process for forming a ballistic resistant closed, thermally fused multilayer article comprising:
a) providing at least one open woven fabric comprising a plurality of warp elongate bodies interwoven and bonded with a plurality of transversely disposed weft elongate bodies, said warp elongate bodies and weft elongate bodies each comprising thermoplastic high tenacity elongate bodies having a tenacity of at least about 14 g/denier and a tensile modulus of at least about 300 g/denier, wherein immediately adjacent warp elongate bodies are spaced apart from each other by a distance equivalent to at least about 10% of the width of the warp elongate bodies and immediately adjacent weft elongate bodies are spaced apart from each other by a distance equivalent to at least about 10% of the width of the weft elongate bodies;

b) providing at least one closed, fused sheet formed from a woven fabric, said woven fabric comprising a plurality of warp elongate bodies interwoven and bonded with a plurality of transversely disposed weft elongate bodies, said warp elongate bodies and weft elongate bodies each comprising thermoplastic high tenacity elongate bodies having a tenacity of at least about 14 g/denier and a tensile modulus of at least about 300 g/denier, wherein immediately adjacent warp elongate bodies are spaced apart from each other by a distance equivalent to at least about 10% of the width of the warp elongate bodies and immediately adjacent weft elongate bodies are spaced apart from each other by a distance equivalent to at least about 10% of the width of the weft elongate bodies, wherein the closed, fused sheet has substantially no gaps between immediately adjacent high tenacity elongate bodies and wherein said high tenacity elongate bodies do not overlap;

c) adjoining the at least one open woven fabric and the at least one closed, fused sheet together; and d) thermally pressing the adjoined at least one woven fabric and at least one fused sheet together under conditions sufficient to attach the woven fabric to the fused sheet and to flatten the high tenacity elongate bodies in the woven fabric, thereby causing the longitudinal edges of the immediately adjacent high tenacity warp elongate bodies in the woven fabric to contact each other, whereby there are substantially no gaps between said immediately adjacent high tenacity warp elongate bodies and wherein said high tenacity warp elongate bodies do not overlap.

The invention still further provides a process for forming a closed, thermally fused multilayer article comprising adjoining a woven fabric with a web comprising a parallel array of high tenacity elongate bodies, wherein the high tenacity elongate bodies of the web are positioned perpendicular to the high tenacity warp elongate bodies of the woven fabric, and thermally pressing the adjoined woven fabric and web under conditions sufficient to attach the woven fabric to the web and to flatten the high tenacity elongate bodies of both the woven fabric and the web respectively, thereby causing longitudinal edges of the immediately adjacent high tenacity elongate bodies in the woven fabric and the web respectively to contact each other, whereby there are substantially no gaps between said immediately adjacent high tenacity elongate bodies and wherein said high tenacity elongate bodies do not overlap.

The invention still further provides a process for forming a closed, thermally fused multilayer article comprising adjoining a closed, fused sheet with a web comprising a parallel array of high tenacity elongate bodies, wherein the high tenacity elongate bodies of the web are positioned perpendicular to the high tenacity elongate bodies of the fused sheet, and thermally pressing the adjoined fused sheet and web under conditions sufficient to attach the fused sheet to the web and to flatten the high tenacity elongate bodies of the web, thereby causing longitudinal edges of the immediately adjacent high tenacity elongate bodies in the web to contact each other whereby there are substantially no gaps between said immediately adjacent high tenacity elongate bodies and wherein said high tenacity elongate bodies do not overlap.

DETAILED DESCRIPTION

As illustrated in FIGS. 1-6, high strength composite sheets are fabricated by interweaving high tenacity warp elongate bodies with transversely disposed high tenacity weft elongate bodies. As used herein, "elongate bodies" are bodies having a length dimension that is much greater than the transverse dimensions of width and thickness. Such includes monofilaments, untwisted multifilament fibers (i.e. untwisted yarns) that are fused or unfused, untwisted thermally fused multifilament tape, or non-fibrous polymeric tape. Such also includes twisted multifilament fibers (i.e. twisted yarns) that are fused or unfused, but it is most preferred that all the elongate bodies forming the fabrics and fused sheets of the invention are untwisted elongate bodies.

As used herein, a "high tenacity" elongate body is one having a tenacity of at least about 14 g/denier, more preferably about 20 g/denier or more, still more preferably about 25 g/denier or more, still more preferably about 30 g/denier or more, still more preferably about 40 g/denier or more, still more preferably about 45 g/denier or more, and most preferably about 50 g/denier or more. Such high tenacity elongate bodies also have a tensile modulus of at least about 300 g/denier, more preferably about 400 g/denier or more, more preferably about 500 g/denier or more, still more preferably about 1,000 g/denier or more and most preferably about 1,500 g/denier or more. The high tenacity elongate bodies also have an energy-to-break of at least about 15 J/g or more, more preferably about 25 J/g or more, more preferably about 30 J/g or more and most preferably have an energy-to-break of about 40 J/g or more. Methods of forming elongate bodies having these combined high strength properties are conventionally known in the art.

The term "denier" refers to the unit of linear density, equal to the mass in grams per 9000 meters of fiber/tape. The term "tenacity" refers to the tensile stress expressed as force (grams) per unit linear density (denier) of an unstressed specimen. The "initial modulus" is the property of a material representative of its resistance to deformation. The term "tensile modulus" refers to the ratio of the change in tenacity, expressed in grams-force per denier (g/d) to the change in strain, expressed as a fraction of the original fiber/tape length (in/in).

As used herein, the term "tape" refers to a flat, narrow, monolithic strip of material having a length greater than its width and an average cross-sectional aspect ratio, i.e. the ratio of the greatest to the smallest dimension of cross-sections averaged over the length of the tape article, of at least about 3:1. A tape may be a fibrous material or a non-fibrous material. A "fibrous material" comprises one or more filaments. The cross-section of a polymeric tape of the invention may be rectangular, oval, polygonal, irregular, or of any shape satisfying the width, thickness and aspect ratio requirements outlined herein.

Such tapes preferably have a substantially rectangular cross-section with a thickness of about 0.5 mm or less, more preferably about 0.25 mm or less, still more preferably about 0.1 mm or less and still more preferably about 0.05 mm or less. In the most preferred embodiments, the polymeric tapes have a thickness of up to about 3 mils (76.2 μm), more preferably from about 0.35 mil (8.89 μm) to about 3 mils (76.2 μm), and most preferably from about 0.35 mil to about 1.5 mils (38.1 μm). Thickness is measured at the thickest region of the cross-section.

Polymeric tapes useful in the invention have preferred widths of from about 2.5 mm to about 50 mm, more preferably from about 5 mm to about 25.4 mm, even more preferably from about 5 mm to about 20 mm, and most preferably from about 5 mm to about 10 mm. These dimensions may vary but the polymeric tapes formed herein are most preferably fabricated to have dimensions that achieve an average cross-sectional aspect ratio, i.e. the ratio of the greatest to the smallest dimension of cross-sections averaged over the length of the tape article, of greater than about 3:1, more preferably at least about 5:1, still more preferably at least about 10:1, still more preferably at least about 20:1, still more preferably at least about 50:1, still more preferably at least about 100:1, still more preferably at least about 250:1 and most preferred polymeric tapes have an average cross-sectional aspect ratio of at least about 400:1.

Polymeric tapes are formed by conventionally known methods, such as extrusion, pultrusion, slit film techniques, etc. For example, a unitape of standard thickness may be cut or slit into tapes having the desired lengths, which is a desired method for producing tapes from multi-ply non-woven fiber layers. An example of a slitting apparatus is disclosed in U.S. Pat. No. 6,098,510 which teaches an apparatus for slitting a sheet material web as it is wound onto said roll. Another example of a slitting apparatus is disclosed in U.S. Pat. No. 6,148,871, which teaches an apparatus for slitting a sheet of a polymeric film into a plurality of film strips with a plurality of blades. The disclosures of both U.S. Pat. No. 6,098,510 and U.S. Pat. No. 6,148,871 are incorporated herein by reference to the extent consistent herewith. Other exemplary methods are described in U.S. Pat. Nos. 7,300,691; 7,964,266 and 7,964,267, which are incorporated herein by reference to the extent consistent herewith. It is also known to form narrow tape structures by weaving thin strips of fabric, which generally may be accomplished by adjusting the settings on any conventional weaving machine, such as those disclosed in U.S. Pat. Nos. 2,035,138; 4,124,420; 5,115,839, which are incorporated by reference herein to the extent consistent herewith, or by use of a ribbon loom specialized for weaving narrow woven fabrics or ribbons. Useful ribbon looms are disclosed, for example, in U.S. Pat. Nos. 4,541,461; 5,564,477; 7,451,787 and 7,857,012, each of which is assigned to Textilma AG of Stansstad, Switzerland, and each of which is incorporated herein by reference to the extent consistent herewith, although any alternative ribbon loom is equally useful.

Elongate bodies of the invention also include filaments, fibers and yarns. Fibers and yarns are distinguished from filaments in that fibers and yarns are formed from filaments. A fiber may be formed from just one filament or from multiple filaments. A fiber formed from just one filament is referred to either as a "single-filament" fiber or a "mono-filament" fiber, and a fiber formed from a plurality of filaments is referred to as a "multi-filament" fiber. A "yarn" is defined as a single strand consisting of multiple filaments, analogous to a multi-filament fiber. The cross-sections of fibers, filaments and yarns may vary and may be regular or irregular, including circular, flat or oblong cross-sections.

The high tenacity elongate bodies may comprise any conventionally known thermoplastic polymer type having a tenacity of at least about 14 g/denier and a tensile modulus of at least about 300 g/denier. Particularly suitable are elongate bodies formed from polyolefins, including polyethylene and polypropylene; polyesters, including polyethylene terephthalate, polypropylene terephthalate, and polybutylene terephthalate; polyamides; polyphenylenesulfide; gel spun polyvinyl alcohol (PVA); gel spun polytetrafluoroethylene (PTFE); and the like. Particularly preferred are extended chain polyolefin elongate bodies, such as highly oriented, high molecular weight polyethylene, particularly ultra-high molecular weight polyethylene (UHMW PE) elongate bodies, and ultra-high molecular weight polypropylene elongate bodies. Each of these elongate body types described above is conventionally known in the art. Also suitable for producing polymeric elongate bodies are copolymers, block polymers and blends of the above materials. For example, useful elongate bodies may be formed from multi-filament elements comprising at least two different filament types, such as two different types of UHMW PE filaments or a blend of polyester filaments and UHMW PE filaments.

Thermoplastic high tenacity elongate bodies are most suitable herein because they are capable of being deformed by thermal, solid state deformation. Such excludes non-thermoplastic synthetic fibers such as carbon fibers, aramid fibers, glass fibers, polyacrylic fibers, aromatic polyamide fibers, aromatic polyester fibers, polyimide fibers, etc.

Specifically most preferred are elongate bodies formed from ultra high molecular weight polyethylene. Ultra high molecular weight polyethylene filaments, fibers and yarns are formed from extended chain polyethylenes having molecular weights of at least 300,000, preferably at least one million and more preferably between two million and five million. Such extended chain polyethylene fibers/yarns may be grown in solution spinning processes such as described in U.S. Pat. No. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975; 6,969,553; 7,078,099; 7,344,668 and U.S. patent application publication 2007/0231572, all of which are incorporated herein by reference.

Particularly preferred fiber types are any of the polyethylene fibers sold under the trademark SPECTRA® from Honeywell International Inc, including SPECTRA® 900 fibers, SPECTRA® 1000 fibers and SPECTRA® 3000 fibers, all of which are commercially available from Honeywell International Inc. of Morristown, N.J.

The most preferred UHMW PE fibers have an intrinsic viscosity when measured in decalin at 135° C. by ASTM D1601-99 of from about 7 dl/g to about 40 dl/g, preferably from about 10 dl/g to about 40 dl/g, more preferably from about 12 dl/g to about 40 dl/g, and most preferably, from about 14 dl/g to 35 dl/g. The most preferred UHMW PE fibers are highly oriented and have a c-axis orientation function of at least about 0.96, preferably at least about 0.97, more preferably at least about 0.98 and most preferably at least about 0.99. The c-axis orientation function is a description of the degree of alignment of the molecular chain direction with the filament direction. A polyethylene filament in which the molecular chain direction is perfectly aligned with the filament axis would have an orientation function of 1. C-axis orientation function ($f_c$) is measured by the wide angle x-ray diffraction method described in Correale, S. T. & Murthy, Journal of Applied Polymer Science, Vol. 101, 447-454 (2006) as applied to polyethylene.

When it is desired to utilize twisted elongate bodies, various methods of twisting fibers/yarns are known in the art and any method may be utilized. In this regard, twisted multi-filament tapes are formed by first twisting a feed fiber/yarn precursor, followed by compressing the twisted precursor into a tape. Useful twisting methods are described, for example, in U.S. Pat. Nos. 2,961,010; 3,434,275; 4,123,893; 4,819,458 and 7,127,879, the disclosures of which are incorporated herein by reference. The fibers/yarns are twisted to have at least about 0.5 turns of twist per inch of fiber/yarn length up to about 15 twists per inch, more preferably from about 3 twists per inch to about 11 twists per inch of fiber/yarn length. In an alternate preferred embodiment, the fibers/yarns are twisted to have at least 11 twists per inch of fiber/yarn length, more preferably from about 11 twists per inch to about 15 twists per inch of fiber/yarn length. The standard method for determining twist in twisted yarns is ASTM D1423-02. However, twisting is not preferred if it is desired to achieve maximum stab resistance.

When it is desired to utilize fused elongate bodies, various methods of fusing fibers/yarns are known in the art and any method may be utilized. Fused multi-filament tapes are formed by first fusing a feed fiber/yarn precursor followed by compressing the fused precursor into a tape. In this regard, fusion of the fiber/yarn filaments may be accomplished by with the use of heat and tension, or through application of a solvent or plasticizing material prior to exposure to heat and tension as described in U.S. Pat. Nos. 5,540,990; 5,749,214; and 6,148,597, which are hereby incorporated by reference to the extent compatible herewith. Fusion by bonding may be accomplished, for example, by at least partially coating the filaments with a resin or other polymeric binder material having adhesive properties, such as a polystyrene-polyisoprene-polystyrene-block copolymer resin commercially available from Kraton Polymers of Houston, Tex. under the trademark KRATON® D1107, or any other adhesive polymer described herein. They may also be thermally bonded together without an adhesive coating. Thermal bonding conditions will depend on the fiber type. When the feed fibers/yarns are coated with a resin or other polymeric binder material having adhesive properties to bond the filaments, only a small amount of the resin/binder is needed. In this regard, the quantity of resin/binder applied is preferably no more than 5% by weight based on the total weight of the filaments plus the resin/binder, such that the filaments comprise at least 95% by weight of the coated fiber/yarn based on the total weight of the filaments plus the resin/binder, and the corresponding tape formed from the yarn will thereby also comprise at least 95% by weight of the component filaments. More preferably, the fibers/yarns and tapes comprise at least about 96% filaments by weight, still more preferably 97% filaments by weight, still more preferably 98% filaments by weight, and still more preferably 99% filaments by weight. Most preferably, the fibers/yarns and compressed tapes formed therefrom are resin-free, i.e. are not coated with a bonding resin/binder, and consist essentially of or consist only of filaments.

Methods of compressing fibers/yarns into tapes are described, for example, in U.S. Pat. No. 8,236,119 and U.S. patent application Ser. No. 13/568,097, each of which is incorporated herein by reference to the extent consistent herewith. Other methods for forming tapes, including from twisted multifilament fibers/yarns and from untwisted multifilament fibers/yarns, as well as non-fibrous tapes, are described in U.S. patent application Ser. Nos. 13/021,262; 13/494,641, 13/647,926 and 13/708,360, which are also incorporated herein by reference. These methods are useful for forming tapes of this invention having any of the preferred aspect ratios described herein.

The woven fabric is formed using any commonly known weaving technique where longitudinal warp elongate bodies are interwoven with transversely disposed, lateral weft elongate bodies such that the elongate bodies are in an orthogonal 0°/90° orientation. Plain weave is most common. Other weave types non-exclusively include crowfoot weave, basket weave, satin weave and twill weave.

Figure 1:
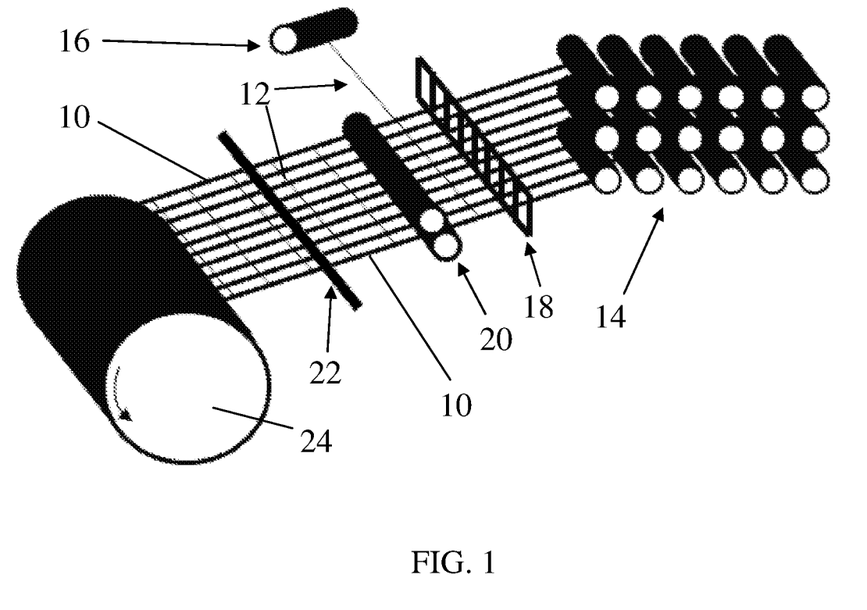
FIG. 1 is a perspective-view schematic representation of a woven fabric having spaced apart high tenacity elongate bodies in both the longitudinal warp direction and the lateral weft direction.

A first embodiment is illustrated in FIG. 1 where a first set of high tenacity elongate bodies 10 are positioned as the longitudinally extending warp bodies and a second set of high tenacity elongate bodies 12 are transversely disposed as the lateral weft bodies. In a typical process, the high tenacity warp elongate bodies 10 are unwound from a plurality of spools that are supported on one or more creels 14. An array of high tenacity elongate bodies 10 is led through a heddle 18 which separates adjacent high tenacity elongate bodies 10 so that they are spaced apart from each other (at their nearest longitudinal edges) by a distance equivalent to at least about 10% of the width of the high tenacity elongate bodies. This amount of separation ensures that the subsequent thermal fusion step achieves a full and complete closure of the space between adjacent high tenacity elongate bodies 10 so that abutting longitudinal edges of the elongate bodies 10 press against each other such that they are substantially in contact with each other without overlapping. In this regard, all of the high tenacity elongate bodies in the warp direction are preferably uniform in width and also preferably uniform in thickness. It is also preferred that all of the high tenacity elongate bodies in the weft direction are preferably uniform in width and also preferably uniform in thickness. If not uniform in width, the separation distance should be calculated by measuring the elongate bodies at the location of greatest width. This is the case for all warp and weft fibers of the invention. It is also preferred, although not required, that all the high tenacity bodies in the warp direction have the same width and thickness as all the high tenacity bodies in the weft direction. Most preferably, all the warp and weft high tenacity elongate bodies are identical to each other. The subsequent thermal fusion step will accordingly fully close the space between all adjacent high tenacity elongate bodies 10 and achieve a fully closed, gapless woven fabric structure. Full, complete closure is not mandatory but is most preferred.

In the more preferred embodiments of the invention, the heddle 18 separates adjacent high tenacity warp elongate bodies 10 so that they are spaced apart at their nearest longitudinal edges by at least about 15% of the width of the high tenacity warp bodies, still more preferably by about 15% to about 50% of the width of the high tenacity warp bodies, and most preferably from about 20% to about 30% of the width of the high tenacity warp bodies. In preferred embodiments of the invention, these width percentages of separation measure to a separation of at least about 0.5 mm, more preferably 1 mm and still more preferably greater than 1 mm, still more by at least about 1.5 mm, still more preferably at least about 2 mm, still more preferably by about 3 mm to about 30 mm and most preferably by about 4 mm to about 20 mm. The separation must be less than about 50% of the width of the high tenacity warp bodies to ensure that the thermal fusion step fully closes the space between all adjacent high tenacity warp elongate bodies 10 to achieve a fully closed, gapless woven fabric structure.

Figure 7:
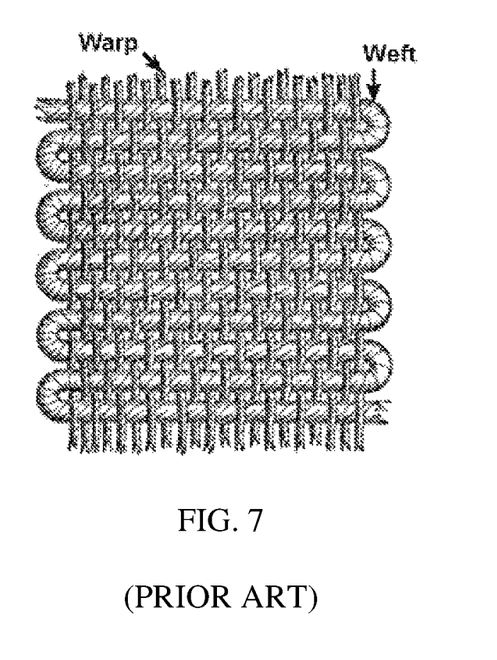
FIG. 7 is a perspective-view schematic representation illustrating a conventional plain weave structure having longitudinal warp fibers, lateral weft fibers and selvage loops at its lateral edges.

Referring again to FIG. 1, after the high tenacity warp elongate bodies 10 pass through the heddle 18, the high tenacity weft elongate bodies 12 are transversely interwoven with the high tenacity elongate bodies 10 according to standard weaving techniques. The high tenacity weft elongate bodies 12 are unwound from one or more spools that are supported on one or more creels 16. As illustrated in FIG. 7 which illustrates a typical weaving process, conventional weaving positions one long, continuous weft strand between each pair of adjacent warp strands across the full width of the array of high tenacity elongate bodies 10. After passing the weft strand once across the array of warp strands, the weaving machine turns the weft strand, reversing direction and passing back across the array of warp strands in the opposite direction. As shown in FIG. 7, this forms selvage loops at the side edges of the woven fabric which are typically trimmed or cut off during further processing. When the selvage loops are trimmed or cut off, the resulting structure incorporates a plurality of discontinuous weft bodies in a substantially parallel array. When the selvage loops are not trimmed or cut off, the resulting structure incorporates a single weft elongate body having a plurality of weft body portions where the weft body portions are in a substantially parallel array. For each embodiment of this invention, such weft body portions of one long, continuous weft body that are transversely disposed relative to the longitudinal warp bodies are to be interpreted as being a plurality of lateral weft bodies.

Equally useful in the practice of this invention is an alternative weaving process used when tapes are inserted in the weft direction, whereby the continuous tape is pulled through the warp bodies in only one direction and the inserted tape is then cut at the fabric edge to form the new tape end that will next be pulled through the warp bodies, such that no selvage loops are formed.

The weaving equipment is set to space adjacent high tenacity weft elongate bodies 12 (such as adjacent parallel portions of one continuous elongate body 12) apart from each other by at least about 2 mm, more preferably from about 3 mm to about 30 mm and most preferably from about 4 mm to about 20 mm. As described herein, only the transversely disposed high tenacity weft elongate bodies are present in the space between adjacent high tenacity warp elongate bodies.

After the high tenacity weft elongate bodies 12 are woven through the high tenacity warp elongate bodies 10 in the weft direction, the high tenacity warp elongate bodies 10 and high tenacity weft elongate bodies 12 are preferably thermally bonded together at their points of intersection. Such thermal bonding is accomplished by at least partially melting the thermoplastic high tenacity elongate bodies with a heating element 22, thereby activating the thermoplastic polymers so that they are capable of adhering to each other. The melted thermoplastic polymer of the high tenacity elongate bodies is then allowed to solidify. Once the polymer is solidified at the warp-weft body junction point, the high tenacity weft elongate bodies 12 are bonded to the high tenacity warp elongate bodies 10, thereby forming a dimensionally stable open fabric.

Heating element 22 is illustrated in FIG. 1 as a rectangular bar that heats by direct contact with the high tenacity elongate bodies 12 (i.e. conductive heating). Heating may be accomplished by other suitable methods, such as convective heating (e.g. hot air), radiant heating (e.g. infrared heating), as well as any other means of conductive heating. However, relatively tight temperature control is required to only partially melt the high tenacity bodies. Accordingly, conductive heating methods are preferred. Most preferably, heating element 22 is a conductive heating element capable of applying pressure to the melted high tenacity elongate bodies to assist in their bonding. Heating element 22 heats the high tenacity elongate bodies to a temperature of from about 270° F. (~132° C.) to about 330° F. (~166° C.), more preferably from about 280° F. (~138° C.) to about 320° F. (~160° C.), still more preferably from about 285° F. (~141° C.) to about 315° F. (~157° C.), and most preferably from about 290° F. (~143° C.) to about 310° F. (~154° C.).

The bonding of the elongate bodies at the warp-weft crossing points mechanically stabilizes the open fabric structure by fixing the high tenacity weft elongate bodies 12 in their position and thereby achieving fixed gaps between the high tenacity elongate bodies 10 that are maintained during fabric handling, preferably such that the dimensions of all gaps in the fabric are identical. The heat from heating element 22 is sufficient to make the high tenacity weft bodies 12 and/or the high tenacity warp bodies 10 tacky so that the bodies become sufficiently bonded at the warp-weft crossing points.

This process produces a first dimensionally stable open woven fabric that is preferably wound onto a first storage roll 24 and saved for later processing. According to the process of the invention, a second dimensionally stable open woven fabric is preferably fabricated and adjoined with the first open woven fabric. The second open woven fabric may be identical to the first open woven fabric or different. Preferably the second open woven fabric is fabricated according to the same methods described above for fabricating the first open woven fabric. The second open woven fabric is then preferably wound onto a second storage roll 26 (illustrated in FIG. 3) and saved for later processing.

As shown in FIG. 1, optional tension rolls 20 may be provided to provide tension to the warp fibers and assist in pulling the warp fibers toward first storage roll 24 (or to a second storage roll 26). Although the optional tension rolls 20 are illustrated in FIG. 1 as being positioned between the heddle 18 and heating element 22, this position is only exemplary and may be placed in other locations or entirely eliminated as would be determined by one skilled in the art. If the tension rolls 20 are heated, they may assist in the thermal bonding process, and also may replace the function of the heating element 22 by applying adequate heat and pressure to cause partial melting and fusing at the warp-weft crossover points.

The woven fabrics produced according to each of these two embodiments are open fabrics having spaces or holes defined by the spacing of adjacent warp bodies and the spacing of adjacent weft bodies. In preferred embodiments of the invention, only the transversely disposed weft elongate bodies are present between adjacent high tenacity warp elongate bodies. However, it is within the scope of the invention that binding elongate bodies may also be interwoven in the warp or weft directions, said binding warp elongate bodies being positioned in the space between adjacent high tenacity warp elongate bodies and/or in the space between adjacent high tenacity weft elongate bodies. As used herein, a "binding" elongate body is an elongate body that at least partially comprises a heat activated thermoplastic polymer having a melting temperature below a melting temperature of the high tenacity elongate bodies. Said binding elongate bodies may be single component binder element or multi-component elongate bodies. A single component elongate body is a fiber, yarn or tape formed entirely from a heat activated thermoplastic polymer having a melting temperature below a melting temperature of the high tenacity elongate bodies. Such are conventionally known in the art and non-exclusively include bodies comprising ethylene-vinyl acetate, ethylene-acrylate copolymers, styrene block copolymers, polyurethanes, polyamides, polyesters and polyolefins, including and most preferably polyethylene. Multi-component fibers, for example bi-component fibers, are known having multiple distinct cross-sectional domains of distinct polymer types differing from each other in composition (e.g., polyurethane and polyethylene) and/or differing in visual response, e.g., color. Bi-component fibers have two distinct cross-sectional domains of two distinct polymer types. Various types of bi-component fibers are known and include side-by-side fibers, sheath/core fibers (also known as sheathed core fibers) which may be concentric or eccentric, pie wedge fibers, islands/sea fibers and others. Such are well known in the art. Bi-component fibers and methods for their manufacture are described for example in U.S. Pat. Nos. 4,552,603; 4,601,949; and 6,158,204, the disclosures of which are incorporated by reference herein to the extend compatible herewith.

When present, preferred are binding elongate bodies that comprise bi-component elongate bodies comprising a first component and a second component, wherein the first component comprises a heat activated thermoplastic polymer having a melting temperature below a melting temperature of the high tenacity elongate bodies, and wherein the first component has a melting temperature that is below a melting temperature of second component. Suitable heat activated thermoplastic polymers for the first component non-exclusively includes those described above. Suitable second components comprising a bi-component fiber non-exclusively include the high tenacity polymer types described above. In a most preferred embodiment, the bi-component elongate bodies are sheathed core bi-component fibers, wherein the second polymer component is a core fiber comprising a high tenacity monofilament fiber or a high tenacity multifilament fiber and the first polymer component is a sheath comprising a heat activated, thermoplastic polymer. Preferred heat activated thermoplastic polymers are described above. Preferred core fibers may be any thermoplastic or non-thermoplastic high tenacity fiber, including aramid fibers, carbon fibers, glass fibers, UHMW PE fibers and others. Most preferably, the core fiber is a glass fiber or a UHMW PE fiber. A most preferred single-component elongate body is a UHMW PE fiber, preferably a monofilament or monofilament-like UHMW PE fiber. A most preferred bi-component elongate body comprises a UHMW PE fiber core (preferably a monofilament or monofilament-like UHMW PE fiber) sheathed with an EVA thermoplastic polymer.

In preferred embodiments of the invention, when the binding bodies are present, they are preferably thermally bonded to the high tenacity bodies that are oriented perpendicular to the binding bodies at their points of intersection by passage through heating element 22. Such thermal bonding is accomplished by at least partially melting the thermoplastic polymer component of the binding elongate bodies with the heating element 22, thereby activating the thermoplastic polymer so that it is capable of adhering to the high tenacity elongate bodies and then allowing the melted thermoplastic polymer of the binding elongate bodies 12 to solidify. This bonding step is preferably achieved without external pressure. The heat from heating element 22 is adequate enough to make the adhesive coating of the binding bodies tacky so that the bodies become sufficiently bonded at the warp-weft crossing points, with inherent internal pressure of contact between crossing fibers in the woven structure being sufficient to bond the bodies to each other. Once the polymer is solidified at the warp-weft body junction point with the perpendicular high tenacity elongate bodies, the binding elongate bodies are bonded to the high tenacity elongate bodies, further enhancing the dimensional stability of the open fabric.

Whether the optional binding elongate bodies are single component thermoplastic bodies or bi-component elongate bodies, the high tenacity elongate bodies preferably comprise at least about 90% by weight of the fabric, more preferably greater than about 90% by weight of the fabric, still more preferably at least about 95% by weight of the fabric, still more preferably at least about 98% by weight of the fabric, and most preferably at least about 99% by weight of the fabric. In this regard, when present, the binding elongate bodies are preferably incorporated at a pick per inch (ppi) of from about 5 picks per inch to about 15 picks per inch, preferably from about 5 picks per inch to about 10 picks per inch, or alternatively from about 10 picks per inch to about 15 picks per inch.

In accordance with the present invention, after the open fabric structures are woven, they are then heated and pressed under conditions sufficient to flatten the thermoplastic, high tenacity elongate bodies and thereby close the holes by causing edges of the adjacent high tenacity elongate bodies to contact each other.

Figure 2:
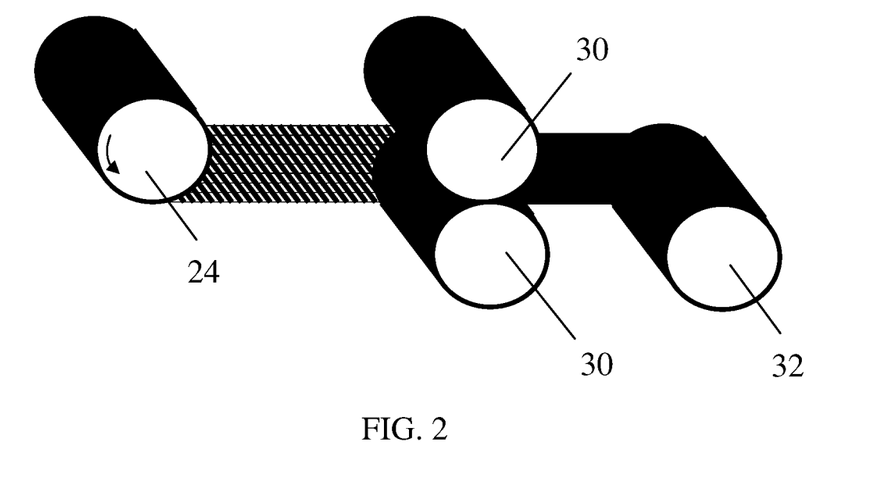
FIG. 2 is a perspective-view schematic representation illustrating the formation of a closed, fused sheet by the thermal fusion of a single open woven fabric having spaced apart high tenacity elongate bodies in both the longitudinal warp direction and the lateral weft direction.
Figure 3:
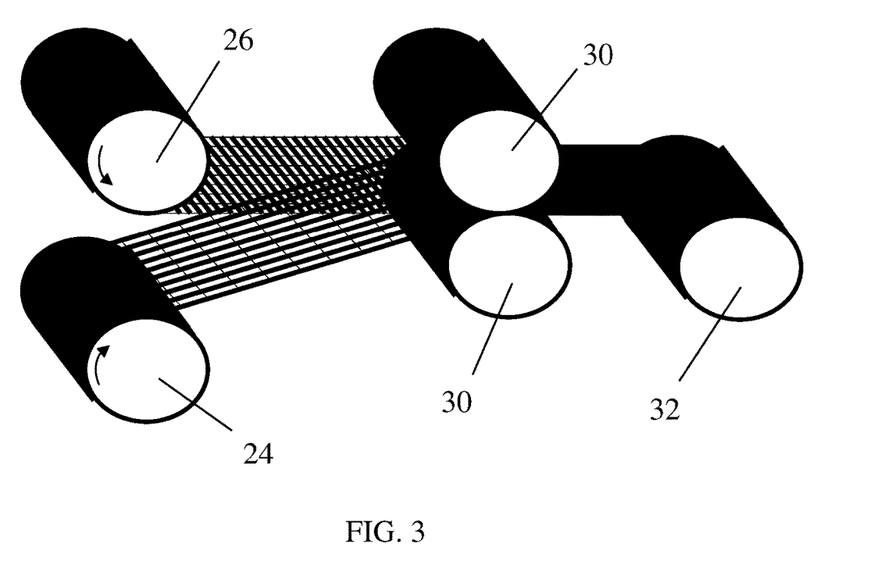
FIG. 3 is a perspective-view schematic representation illustrating the formation of a closed multi-layer fabric where a first open woven fabric having spaced apart high tenacity elongate bodies in both the longitudinal warp direction and the lateral weft direction is thermally fused together with a second woven fabric having spaced apart high tenacity elongate bodies in both the longitudinal warp direction and the lateral weft direction.
Figure 5:
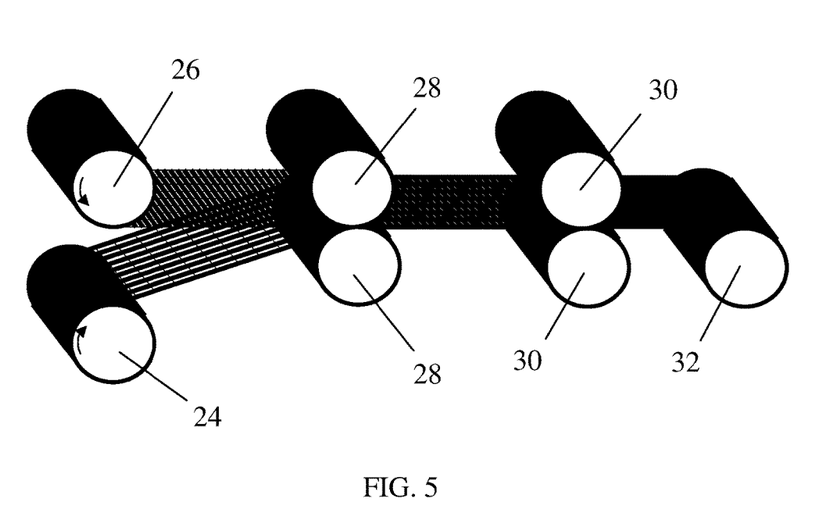
FIG. 5 is a perspective-view schematic representation illustrating the attachment of a first open woven fabric to a second woven fabric by passage through a first set of rolls before they are fused together between a second set of rolls.

This thermal fusion may be performed on a single open fabric to form a single closed, thermally fused sheet as illustrated in FIG. 2 or may be performed on multiple adjoined open fabrics together to form a closed, thermally fused multilayer article in one step as illustrated in FIGS. 3 and 5.

As illustrated in FIG. 2, the thermal fusion process is preferably conducted as a continuous process where a dimensionally stable open woven fabric is unwound from a first storage roll 24 and passed through pressure rolls 30. Rolls 30 are preferably heated to a temperature of from about 200° F. (~93° C.) to about 350° F. (~177° C.), more preferably from about 200° F. to about 315° F. (~157° C.), still more preferably from about 250° F. (~121° C.) to about 315° F., and most preferably from about 280° F. (~138° C.) to about 310° F. (~154° C.). The most suitable temperature will vary depending on the melting point of the polymer used to form the high tenacity elongate bodies. Rolls 30 exert pressure on the open, woven fabric, pressing it at a pressure of from about 50 psi (344.7 kPa) to about 50,000 psi (344.7 MPa), more preferably about 500 psi (3.447 MPa) to about 20,000 psi (137.9 MPa) and most preferably from about 1,000 psi (6.895 MPa) to about 10,000 psi (68.957 MPa). Pressing the open woven fabric through the heated pressure rolls 30 produces a thermally fused sheet having no gaps between the warp elongate bodies without said bodies overlapping. If necessary, in each embodiment of the invention, the fabric may be passed through rolls 30 multiple times (or through additional rolls 30) to achieve the preferred gapless, fully closed sheet structure. Driven roll 32 collects the fused sheet and provides a controlled tension in the sheet. The sheet is preferably cooled to below the melting temperature of the high tenacity elongate bodies before contact with roll 32.

Figure 4:
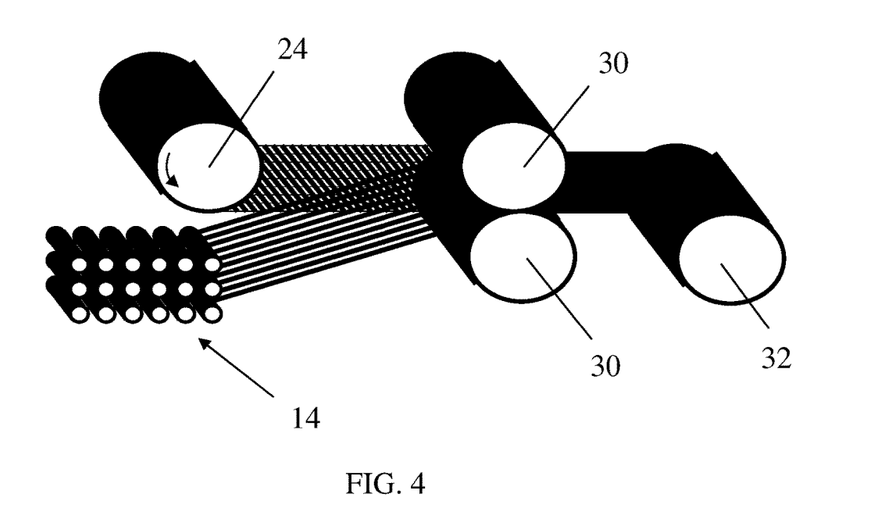
FIG. 4 is a perspective-view schematic representation illustrating the formation of a closed, thermally fused multilayer article where an open woven fabric is thermally fused with a web comprising a unidirectional array of longitudinal high tenacity elongate bodies supplied from a creel.

As illustrated in FIG. 3, the thermal fusion process is preferably conducted as a continuous process where a first dimensionally stable open woven fabric is unwound from a first storage roll 24 and a second dimensionally stable open woven fabric is unwound from a second storage roll 26, with the two fabrics being adjoined and fused to each other by passing through heated pressure rolls 30 according to the conditions described above. As illustrated in FIG. 4, a first dimensionally stable open woven fabric is fused with a unidirectional array of longitudinal high tenacity elongate bodies supplied from a creel 14 rather than a second dimensionally stable open woven fabric. Fusion is achieved by passing through heated pressure rolls 30.

Figure 6:
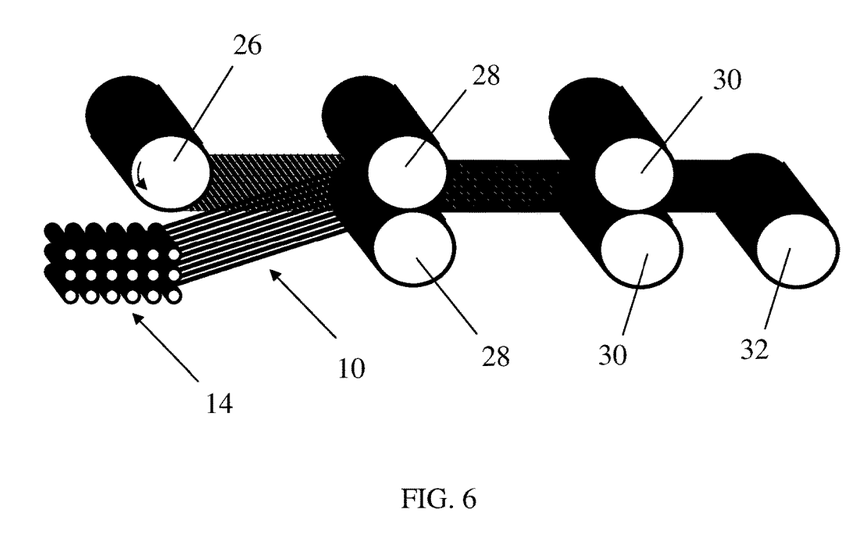
FIG. 6 is a perspective-view schematic representation illustrating the attachment of an open woven fabric to a unidirectional array of longitudinal high tenacity elongate bodies supplied from a creel by passage through a first set of rolls before they are fused together between a second set of rolls.

FIGS. 5 and 6 illustrate embodiments that include an additional set of rolls (rolls 28) that are employed when one or more open woven fabrics include the optional binding elongate bodies (not shown). FIG. 5 illustrates an embodiment where a first dimensionally stable, open woven fabric is unwound from a storage roll 24 and attached to a second woven fabric unwound from storage roll 26. The two fabrics are then attached to each other by passage through a first set of rolls 28 before they are fused together between a second set of rolls 30. FIG. 6 illustrates an embodiment where a first dimensionally stable, open woven fabric is unwound from a storage roll 24 and a unidirectional array of longitudinal high tenacity elongate bodies is supplied from a creel 14. The fabric and array of high tenacity bodies are then attached to each other by passage through a first set of rolls 28 before they are fused together between a second set of rolls 30. The binding elongate bodies help adhere the woven fabrics to each other (or the woven fabric to the array of high tenacity bodies), and rolls 28 facilitate their attachment. Rolls 28 are preferably heated to a temperature that is slightly above the melting point of the binding elongate bodies. Preferably rolls 28 are heated at a temperature that is no more than 10° C. above the melting temperature of the binding elongation bodies, and most preferably at a temperature that is no more than 5° C. above the melting temperature of the binding elongation bodies. The most suitable temperature will vary depending on the melting point of the polymer used to form the binding elongate bodies. In the preferred embodiments, such temperatures for roll 28 are preferably from about 200° F. (~93° C.) to about 350° F. (~177° C.), more preferably from about 200° F. to about 315° F. (~157° C.), still more preferably from about 250° F. (~121° C.) to about 315° F., and most preferably from about 280° F. (~138° C.) to about 310° F. (~154° C.). Rolls 28 also preferably exert light pressure on the fabrics (or fabric and web) to attach them to each other.

The adjoined/attached, heated fabrics are then continuously passed through pressure rolls 30, pressing them together as described above to form a fused sheet.

When the binding elongate bodies are present, rolls 30 are preferably heated to a temperature that is slightly below the melting point of the high tenacity elongate bodies. Preferably, rolls 30 are heated at a temperature that is no more than 5° C. below the melting temperature of the high tenacity elongation bodies, and most preferably at a temperature that is no more than 3° C. below the melting temperature of the high tenacity elongation bodies. Pressing the adjoined fabrics between heated pressure rolls 30 produces a thermally fused sheet having no gaps between the warp elongate bodies without the bodies overlapping. Driven roll 32 collects the fused sheet and provides a controlled tension in the sheet. The sheet is preferably cooled to below the melting temperature of the high tenacity elongate bodies before contact with roll 32. In each of the continuous roll processes described herein, the duration of passage through rolls 30 and optional rolls 28 will be at a rate of from about 1 meter/minute to about 100 meters/minute, more preferably from about 2 meters/minute to about 50 meters/minute, still more preferably from about 3 meters/minute to about 50 meters/min, still more preferably from about 4 meters/minute to about 30 meters/minute, and most preferably from about 5 meters/minute to about 20 meters/minute.

In addition to the multi-stage continuous pressing process illustrated in FIGS. 5 and 6, it is possible to adjoin and flatten the two layers (i.e. two woven fabrics or a fabric and an array of high tenacity bodies) in a single continuous pressing stage. Multi-stage and single-stage batch processes using heated-platen presses can also be used to adjoin and flatten two or more layers of dimensionally stable open woven fabrics of this invention, or one or more layers of fabric with one or more arrays of high tenacity bodies.

In accordance with the invention, pressing the softened, spaced apart high tenacity elongate bodies 10 with sufficient pressure will flatten them, reducing them in thickness while increasing them in width, whereby the space between adjacent high tenacity elongate bodies is substantially eliminated, and most preferably completely eliminated. Due to such flattening and expansion of the width of the high tenacity elongate bodies, the nearest longitudinal edges of adjacent the high tenacity elongate bodies are brought into contact with each other whereby there are substantially no gaps between said adjacent high tenacity elongate bodies and wherein said adjacent high tenacity elongate bodies do not overlap, achieving a closed, thermally fused sheet.

The high tenacity elongate bodies, including high tenacity fibers, yarns and tapes, may be of any suitable denier. For example, fibers/yarns may have a denier of from about 50 to about 10,000 denier, more preferably from about 200 to 5,000 denier, still more preferably from about 650 to about 4,000 denier, and most preferably from about 800 to about 3,000 denier. Tapes may have deniers from about 50 to about 30,000, more preferably from about 200 to 10,000 denier, still more preferably from about 650 to about 5,000 denier, and most preferably from about 800 to about 3,000 denier. When present, the binding elongate bodies preferably have a denier of from about 20 to about 2000, more preferably from about 50 to about 500, still more preferably from about 60 to about 400, and most preferably from about 70 to about 300. The selection of elongate body denier is governed by considerations of ballistic effectiveness and cost. Finer fibers/yarns/tapes are more costly to manufacture and to weave, but can produce greater ballistic effectiveness per unit weight. Multifilament tapes are typically formed by thermally fusing together from 2 to about 1000 filaments, more preferably from 30 to 500 filaments, still more preferably from 100 to 500 filaments, still more preferably from about 100 filaments to about 250 filaments and most preferably from about 120 to about 240 filaments. The greater number of filaments typically translates to higher tape deniers.

As the thermal pressing step will reduce the thickness of the elongate bodies, it will also reduce the thickness of the overall woven structure. The thickness of the open fabrics and closed, thermally fused sheets will correspond to the thickness of the individual high tenacity elongate bodies before and after flattening, respectively. A preferred open woven fabric will have a preferred thickness of from about 10 μm to about 600 μm, more preferably from about 20 μm to about 385 μm and most preferably from about 30 μm to about 255 μm. A preferred closed, thermally fused sheet will have a preferred thickness of from about 5 μm to about 500 μm, more preferably from about 10 μm to about 250 μm and most preferably from about 15 μm to about 150 μm.

A plurality of such single layer or multilayer closed, thermally fused sheets may be fabricated according to the methods described herein, then stacked on top of each other coextensively and consolidated to form a ballistic resistant article having superior ballistic penetration resistance. For the purposes of the invention, articles that have superior ballistic penetration resistance describe those which exhibit excellent properties against deformable projectiles, such as bullets, and against penetration of fragments, such as shrapnel.

As used herein, "consolidating" refers to combining a plurality of fabrics into a single unitary structure. For the purposes of this invention, consolidation can occur with heat and/or pressure or without heat and/or pressure and with or without an intermediate adhesive between fabrics/sheets. For example, the fused sheets may be glued together, as is the case in a wet lamination process. Due to the unique process used to form the closed, thermally fused sheets, it is a unique feature of this invention that an intermediate adhesive coating is optional and not required to form a ballistic resistant article. The flat structure of the fused sheets allows them to be merely hot-pressed together with sufficient bonding according to conventional consolidation conditions. Consolidation may be done at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. As is conventionally known in the art, consolidation may be conducted in a calender set, a flat-bed laminator, a press or in an autoclave. Consolidation may also be conducted by vacuum molding the material in a mold that is placed under a vacuum. Vacuum molding technology is well known in the art.

To the extent that an intermediate adhesive is used, ballistic resistant articles of the invention may be consolidated with a lower quantity of adhesive resin than is typically needed for forming articles from un-fused, uncompressed sheets because the adhesive need only be applied as a surface layer without impregnating or coating the individual component filaments of the component elongate bodies to promote bonding of one closed sheet to another closed sheet. Accordingly, the total weight of an adhesive or binder coating in a composite preferably comprises from about 0% to about 10%, still more preferably from about 0% to about 5% by total weight of the component filaments plus the weight of the coating. Even more preferably, ballistic resistant articles of the invention comprise from about 0% to about 2% by weight of an adhesive coating, or about 0% to about 1% by weight, or only about 1% to about 2% by weight.

Suitable adhesive materials include both low modulus materials and high modulus materials. Low modulus adhesive materials generally have a tensile modulus of about 6,000 psi (41.4 MPa) or less according to ASTM D638 testing procedures and are typically employed for the fabrication of soft, flexible armor, such as ballistic resistant vests. High modulus adhesive materials generally have a higher initial tensile modulus than 6,000 psi and are typically employed for the fabrication of rigid, hard armor articles, such as helmets.

Representative examples of low modulus adhesive materials include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly (isobutylene-co-isoprene), polyacrylates, polyesters, polyethers, fluoroelastomers, silicone elastomers, copolymers of ethylene, polyamides (useful with some filament types), acrylonitrile butadiene styrene, styrene-isoprene-styrene (SIS) block copolymers, elastomeric polyurethanes, polycarbonates, acrylic polymers, acrylic copolymers, acrylic polymers modified with non-acrylic monomers, and combinations thereof, as well as other low modulus polymers and copolymers curable below the melting point of the non-polymeric tapes or of the filaments forming the tapes. Also preferred are blends of different elastomeric materials, or blends of elastomeric materials with one or more thermoplastics. Particularly preferred are polystyrene-polyisoprene-polystyrene-block copolymers sold under the trademark KRATON® from Kraton Polymers of Houston, Tex.

Preferred high modulus binder materials include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. Particularly suitable rigid polymeric binder materials are those described in U.S. Pat. No. 6,642,159, the disclosure of which is incorporated herein by reference to the extent consistent herewith. A polymeric adhesive material may be applied according to conventional methods in the art.

When forming a multilayer article, a plurality of fabrics are overlapped atop each other, most preferably in coextensive fashion, and consolidated into single-layer, monolithic element. In the most preferred embodiments, the high tenacity warp elongate bodies of a first fabric are perpendicular to the high tenacity warp elongate bodies of a second, adjacent fabric (i.e. 0°/90° high tenacity body orientations relative to the longitudinal axis of the warp bodies of each fabric, respectively), and this structure continues so that the high tenacity warp elongate bodies in all odd numbered layers are oriented in the same direction and the high tenacity weft elongate bodies in all even numbered layers are oriented in the same direction. Although orthogonal 0°/90° elongate body orientations are preferred, adjacent fabrics can be aligned at virtually any angle between about 0° and about 90° with respect to the central longitudinal axis of warp bodies in another fabric. For example, a five fabric structure may have fabrics oriented at a 0°/45°/90°/45°/0° or at other angles, such as rotations of adjacent fabrics in 15° or 30° increments, with respect to the longitudinal axis of the high tenacity warp elongate bodies. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith.

Ballistic resistant, multilayer articles of the invention will typically include from about from about 2 to about 100 of the closed, thermally fused sheets (layers), more preferably from about 2 to about 85 layers, and most preferably from about 2 to about 65 layers. The greater the number of plies translates into greater ballistic resistance, but also greater weight. The number of layers also affects the areal density of the composites, and the number of layers forming a desired composite will vary depending upon the ultimate end use of the desired ballistic resistant article. Minimum levels of body armor ballistic resistance for military use are categorized by National Institute of Justice (NIJ) Threat Levels, as is well known in the art.

Multilayer articles of the invention comprising a consolidated plurality of closed, thermally fused sheets of the invention preferably have an areal density of at least 100 g/m$^2$, preferably having an areal density of at least 200 g/m$^2$ and more preferably having an areal density of at least 976 g/m$^2$. Most preferably, such multilayer articles have an areal density of at least 4000 g/m$^2$ (4.0 ksm)(about 0.82 psf). In preferred embodiments, multilayer articles of the invention have an areal density of from about 0.2 psf (0.976 ksm) to about 8.0 psf (39.04 ksm), more preferably from about 0.3 psf (1.464 ksm) to about 6.0 psf (29.28 ksm), still more preferably from about 0.5 psf (2.44 ksm) to about 5.0 psf (24.4 ksm), still more preferably from about 0.5 psf (2.44 ksm) to about 3.5 psf (17.08 ksm), still more preferably from about 1.0 psf (4.88 ksm) to about 3.0 psf (14.64 ksm), and still more preferably from about 1.5 psf (7.32 ksm) to about 3.0 psf (14.64 ksm).

Articles of the invention may be formed from a plurality of closed, thermally fused sheets where each fused sheet comprises the same type of high tenacity elongate body, or where each fused sheet comprises a different type of high tenacity elongate body. Alternately, a hybrid structure may be formed where the at least two different types of fused sheets are adjoined where the thermally fused sheets individually comprise multiple different high tenacity elongate body types in a single structure. For example, closed, thermally fused sheets may be fabricated from open, woven fabrics that include at least two different polymeric tape types wherein a first tape type comprises polyethylene filaments and a second tape type comprise polypropylene filaments. In another alternative embodiment, woven fabrics may be fabricated from a combination of fibrous tapes and non-fibrous tapes. In still another alternative embodiment, one thermally fused sheet forming a multilayer article may include binding fibers between the high tenacity elongate bodies while another thermally fused sheet of the article does not include any binding fibers.

The multilayer composite articles of the invention may be used in various applications to form a variety of different ballistic resistant articles using well known techniques, including flexible, soft armor articles as well as rigid, hard armor articles. For example, suitable techniques for forming ballistic resistant articles are described in, for example, U.S. Pat. Nos. 4,623,574, 4,650,710, 4,748,064, 5,552,208, 5,587,230, 6,642,159, 6,841,492 and 6,846,758, all of which are incorporated herein by reference to the extent not incompatible herewith. The composites are particularly useful for the formation of hard armor and shaped or unshaped sub-assembly intermediates formed in the process of fabricating hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. Such hard articles are preferably, but not exclusively, formed using a high tensile modulus binder material. The structures can be cut into a plurality of discrete sheets and stacked for formation into an article or they can be formed into a precursor which is subsequently used to form an article. Such techniques are well known in the art.

The following examples serve to illustrate the invention.

Example 1

Spools of high tenacity UHMWPE fibrous tape having a tenacity of approximately 33 g/denier were arranged in a creel. The tapes were made according to a process described in U.S. Pat. No. 8,236,119. They averaged about 3/16 inch wide and had an aspect ratio of greater than 10:1. A plurality of the fibrous tapes were issued from the creel, arranged into a parallel array and fed to the header of a weaving machine set for 5.3 tapes per inch in the warp direction with the tapes being spaced apart. The width of the parallel array of tapes to be woven in the warp direction was about 16 inches wide. The same type of high strength fibrous tape was used in the fill direction at about 5.3 tapes per inch to form a balanced basket weave. The result was a loosely woven fabric having "holes" or "gaps" between the tapes in both the warp and fill directions.

Example 2

The woven fabric of Example 1 was cut into a sample measuring 16 inches by 16 inches (L×W). This sample was then pressed for about 10 minutes at 285° F. and 5000 psi together with a 6 mil thick film of low density polyethylene film on each outer surface. After pressing, the press was cooled down to 100° F. under pressure before the pressed fabric was released. The resulting closed, fused sheet changed in appearance from opaque to translucent and there were substantially no gaps or holes in the pressed, fused sheet. A plurality of such fused sheets was formed according to the same process. The sheets were then positioned on top of each other coextensively to form a stack, and the stack was then pressed at 295° F. and 5000 psi on a 1500 ton press to form a consolidated panel having an areal density of 1 pound per square foot (psf).

Example 3

The fused sheets that were formed in Example 2 were stacked together without being pressed. The unconsolidated stack was then placed into a soft ballistic jacket to form a flexible body armor vest.

Example 4

A woven fabric formed in Example 2 was pressed as in example 2 but without the outer polyethylene films. The press temperature was 285° F. but the pressure was 2777 psig in a 200 ton press. The resulting fused sheet showed substantially no gaps or holes between adjacent tapes. Several layers of these fused sheets were stacked together and pressed again to consolidate the stack into an 8"×12" (L×W) ballistic panel.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A closed, fused, ballistic and stab resistant sheet comprising a plurality of warp elongate bodies interwoven and bonded with a plurality of transversely disposed weft elongate bodies, said warp elongate bodies and weft elongate bodies each comprising thermoplastic high tenacity elongate bodies having a tenacity of at least about 14 g/denier and a tensile modulus of at least about 300 g/denier, and said warp elongate bodies and weft elongate bodies each comprising multifilament fibers or multifilament tapes;

wherein each of said high tenacity elongate bodies comprises a thermoplastic polymer that comprises a polyolefin, a polyester, a polyamide, polyphenylenesulfide, gel spun polyvinyl alcohol, gel spun polytetrafluoroethylene, or a copolymer, block polymer or blend thereof;

the closed, fused sheet having substantially no gaps between adjacent high tenacity warp elongate bodies and wherein said adjacent high tenacity warp elongate bodies do not overlap; and having substantially no gaps between adjacent high tenacity weft elongate bodies and wherein said adjacent high tenacity weft elongate bodies do not overlap;

wherein said warp elongate bodies and said weft elongate bodies are thermally bonded together in the absence of an adhesive coating by melting and then solidifying the thermoplastic polymer of said high tenacity warp elongate bodies and/or the thermoplastic polymer of said high tenacity weft elongate bodies.

2. A ballistic and stab resistant, closed multilayer article comprising at least two fused sheets of claim 1 attached to each other.

3. A ballistic and stab resistant, closed multilayer article of claim 2, wherein said fused sheets are thermally fused together in the absence of an additional intermediate adhesive resin.

4. The closed, fused, ballistic and stab resistant sheet of claim 1 wherein all of said warp elongate bodies are multifilament fibers and all of said weft elongate bodies are multifilament fibers.

5. The closed, fused, ballistic and stab resistant sheet of claim 1 wherein all of said warp elongate bodies are multifilament tapes and all of said weft elongate bodies are multifilament tapes.

6. The closed, fused, ballistic and stab resistant sheet of claim 1 wherein each of said high tenacity elongate bodies comprise a polyolefin.

7. The closed, fused, ballistic and stab resistant sheet of claim 1 wherein all of said high tenacity elongate bodies comprise polyethylene.

8. The closed, fused ballistic and stab resistant sheet of claim 1 wherein all of said high tenacity elongate bodies comprise ultra-high molecular weight polyethylene.

9. The closed, fused ballistic and stab resistant sheet of claim 1 wherein each of said high tenacity warp elongate bodies and high tenacity weft elongate bodies comprises a multifilament, ultra-high molecular weight polyethylene polymeric tape having a cross-sectional aspect ratio of at least 3:1 and having a width of at least 2.5 mm.

10. The closed, fused ballistic and stab resistant sheet of claim 1 wherein said high tenacity warp elongate bodies comprise untwisted fibrous elongate bodies and said high tenacity weft elongate bodies comprise untwisted fibrous elongate bodies.

* * * * *